Aug. 28, 1962 P. G. NEUMANN 3,051,784

ERROR-CORRECTING SYSTEM

Filed May 12, 1961 5 Sheets-Sheet 1

FIG. 1

COMPLETE CODE SET (rows $a_0$–$a_{14}$, $a_0$–$a_{14}$, $A_0$, $A_1$); MAIN CODE SET (rows $a_0$–$a_{14}$, $a_0$–$a_{14}$); CYCLIC PERMUTATION CODE SET (first rows $a_0$–$a_{14}$)

| | CODE WORDS | | | | | | | | | | | | | | | SUBSETS | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 0 | 1 | 2 | 3 | 4 |
| $a_0$ | 1 | 1 | 1 | 1 | 0 | 1 | 0 | 1 | 1 | 0 | 0 | 1 | 0 | 0 | 0 | 1 | 1 | 1 | 1 | 0 |
| $a_1$ | 1 | 1 | 1 | 0 | 1 | 0 | 1 | 1 | 0 | 0 | 1 | 0 | 0 | 0 | 1 | 1 | 1 | 1 | 0 | 1 |
| $a_2$ | 1 | 1 | 0 | 1 | 0 | 1 | 1 | 0 | 0 | 1 | 0 | 0 | 0 | 1 | 1 | 1 | 1 | 0 | 1 | 0 |
| $a_3$ | 1 | 0 | 1 | 0 | 1 | 1 | 0 | 0 | 1 | 0 | 0 | 0 | 1 | 1 | 1 | 1 | 0 | 1 | 0 | 1 |
| $a_4$ | 0 | 1 | 0 | 1 | 1 | 0 | 0 | 1 | 0 | 0 | 0 | 1 | 1 | 1 | 1 | 0 | 1 | 0 | 1 | 1 |
| $a_5$ | 1 | 0 | 1 | 1 | 0 | 0 | 1 | 0 | 0 | 0 | 1 | 1 | 1 | 1 | 0 | 1 | 0 | 1 | 1 | 0 |
| $a_6$ | 0 | 1 | 1 | 0 | 0 | 1 | 0 | 0 | 0 | 1 | 1 | 1 | 1 | 0 | 1 | 0 | 1 | 1 | 0 | 0 |
| $a_7$ | 1 | 1 | 0 | 0 | 1 | 0 | 0 | 0 | 1 | 1 | 1 | 1 | 0 | 1 | 0 | 1 | 1 | 0 | 0 | 1 |
| $a_8$ | 1 | 0 | 0 | 1 | 0 | 0 | 0 | 1 | 1 | 1 | 1 | 0 | 1 | 0 | 1 | 1 | 0 | 0 | 1 | 0 |
| $a_9$ | 0 | 0 | 1 | 0 | 0 | 0 | 1 | 1 | 1 | 1 | 0 | 1 | 0 | 1 | 1 | 0 | 0 | 1 | 0 | 0 |
| $a_{10}$ | 0 | 1 | 0 | 0 | 0 | 1 | 1 | 1 | 1 | 0 | 1 | 0 | 1 | 1 | 0 | 0 | 1 | 0 | 0 | 0 |
| $a_{11}$ | 1 | 0 | 0 | 0 | 1 | 1 | 1 | 1 | 0 | 1 | 0 | 1 | 1 | 0 | 0 | 1 | 0 | 0 | 0 | 1 |
| $a_{12}$ | 0 | 0 | 0 | 1 | 1 | 1 | 1 | 0 | 1 | 0 | 1 | 1 | 0 | 0 | 1 | 0 | 0 | 0 | 1 | 1 |
| $a_{13}$ | 0 | 0 | 1 | 1 | 1 | 1 | 0 | 1 | 0 | 1 | 1 | 0 | 0 | 1 | 0 | 0 | 0 | 1 | 1 | 1 |
| $a_{14}$ | 0 | 1 | 1 | 1 | 1 | 0 | 1 | 0 | 1 | 1 | 0 | 0 | 1 | 0 | 0 | 0 | 1 | 1 | 1 | 1 |
| $a_0$ | 0 | 0 | 0 | 0 | 1 | 0 | 1 | 0 | 0 | 1 | 1 | 0 | 1 | 1 | 1 | 0 | 0 | 0 | 0 | 1 |
| $a_1$ | 0 | 0 | 0 | 1 | 0 | 1 | 0 | 0 | 1 | 1 | 0 | 1 | 1 | 1 | 0 | 0 | 0 | 0 | 1 | 0 |
| $a_2$ | 0 | 0 | 1 | 0 | 1 | 0 | 0 | 1 | 1 | 0 | 1 | 1 | 1 | 0 | 0 | 0 | 0 | 1 | 0 | 1 |
| $a_3$ | 0 | 1 | 0 | 1 | 0 | 0 | 1 | 1 | 0 | 1 | 1 | 1 | 0 | 0 | 0 | 0 | 1 | 0 | 1 | 0 |
| $a_4$ | 1 | 0 | 1 | 0 | 0 | 1 | 1 | 0 | 1 | 1 | 1 | 0 | 0 | 0 | 0 | 1 | 0 | 1 | 0 | 0 |
| $a_5$ | 0 | 1 | 0 | 0 | 1 | 1 | 0 | 1 | 1 | 1 | 0 | 0 | 0 | 0 | 1 | 0 | 1 | 0 | 0 | 1 |
| $a_6$ | 1 | 0 | 0 | 1 | 1 | 0 | 1 | 1 | 1 | 0 | 0 | 0 | 0 | 1 | 0 | 1 | 0 | 0 | 1 | 1 |
| $a_7$ | 0 | 0 | 1 | 1 | 0 | 1 | 1 | 1 | 0 | 0 | 0 | 0 | 1 | 0 | 1 | 0 | 0 | 1 | 1 | 0 |
| $a_8$ | 0 | 1 | 1 | 0 | 1 | 1 | 1 | 0 | 0 | 0 | 0 | 1 | 0 | 1 | 0 | 0 | 1 | 1 | 0 | 1 |
| $a_9$ | 1 | 1 | 0 | 1 | 1 | 1 | 0 | 0 | 0 | 0 | 1 | 0 | 1 | 0 | 0 | 1 | 1 | 0 | 1 | 1 |
| $a_{10}$ | 1 | 0 | 1 | 1 | 1 | 0 | 0 | 0 | 0 | 1 | 0 | 1 | 0 | 0 | 1 | 1 | 0 | 1 | 1 | 1 |
| $a_{11}$ | 0 | 1 | 1 | 1 | 0 | 0 | 0 | 0 | 1 | 0 | 1 | 0 | 0 | 1 | 1 | 0 | 1 | 1 | 1 | 0 |
| $a_{12}$ | 1 | 1 | 1 | 0 | 0 | 0 | 0 | 1 | 0 | 1 | 0 | 0 | 1 | 1 | 0 | 1 | 1 | 1 | 0 | 0 |
| $a_{13}$ | 1 | 1 | 0 | 0 | 0 | 0 | 1 | 0 | 1 | 0 | 0 | 1 | 1 | 0 | 1 | 1 | 1 | 0 | 0 | 0 |
| $a_{14}$ | 1 | 0 | 0 | 0 | 0 | 1 | 0 | 1 | 0 | 0 | 1 | 1 | 0 | 1 | 1 | 1 | 0 | 0 | 0 | 0 |
| $A_0$ | 0 | 0 | 0 | 0 | 0 | 0 | 0 | 0 | 0 | 0 | 0 | 0 | 0 | 0 | 0 | 0 | 0 | 0 | 0 | 0 |
| $A_1$ | 1 | 1 | 1 | 1 | 1 | 1 | 1 | 1 | 1 | 1 | 1 | 1 | 1 | 1 | 1 | 1 | 1 | 1 | 1 | 1 |

$m=4,\ n=4m-1=15,\ d=2m=1=7,\ N=8m=32$

INVENTOR
P. G. NEUMANN
BY Lucian C. Canepa
ATTORNEY

INVENTOR.
P. G. NEUMANN
BY Lucian C. Canepa

ATTORNEY

FIG. 5
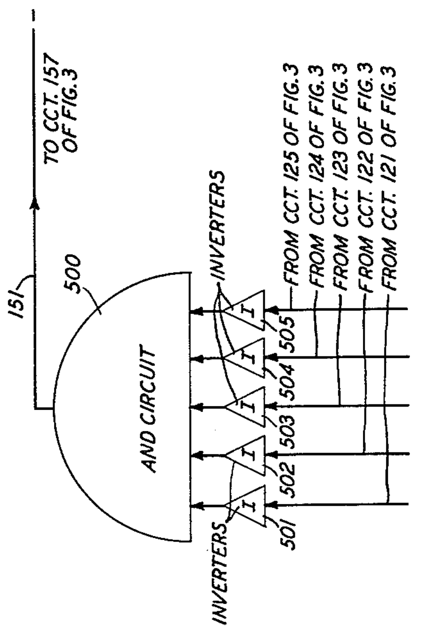
FIG. 6
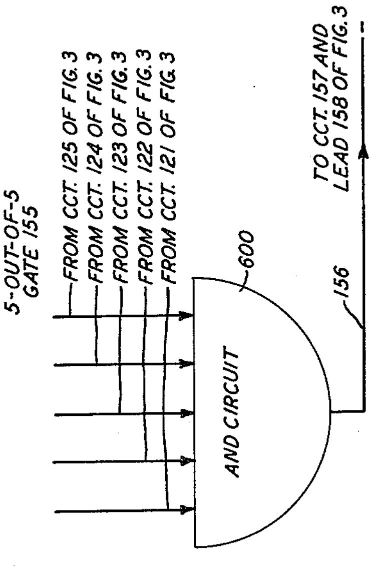
FIG. 2
| m | n = 4m-1 | d = 2m-1 | N = 8m | CYCLIC PERMUTATION CODES | | |
|---|---|---|---|---|---|---|
| 1 | 3 | 1 | 8 | Q = | R = | T |
| 2 | 7 | 3 | 16 | Q = | R | |
| 3 | 11 | 5 | 24 | Q | | |
| 4 | 15 | 7 | 32 | | R = | T |
| 5 | 19 | 9 | 40 | Q | | |
| 6 | 23 | 11 | 48 | Q | | |
| 8 | 31 | 15 | 64 | Q | R = | S |
| 9 | 35 | 17 | 72 | | | T |
| 11 | 43 | 21 | 88 | Q | | S |
| 12 | 47 | 23 | 96 | Q | | |
| 15 | 59 | 29 | 120 | Q | | |
| 16 | 63 | 31 | 128 | | R | U |
| 32 | 127 | 63 | 256 | Q | R = | S |
INVENTOR.
P. G. NEUMANN
BY Lucian C. Canepa
ATTORNEY Aug. 28, 1962 P. G. NEUMANN 3,051,784

ERROR-CORRECTING SYSTEM

Filed May 12, 1961 5 Sheets-Sheet 4

INVENTOR.
P. G. NEUMANN
BY Lucian C. Canepa
ATTORNEY

Aug. 28, 1962 P. G. NEUMANN 3,051,784
ERROR-CORRECTING SYSTEM
Filed May 12, 1961 5 Sheets-Sheet 5
FIG. 4 CIRCULATING REGISTER 130
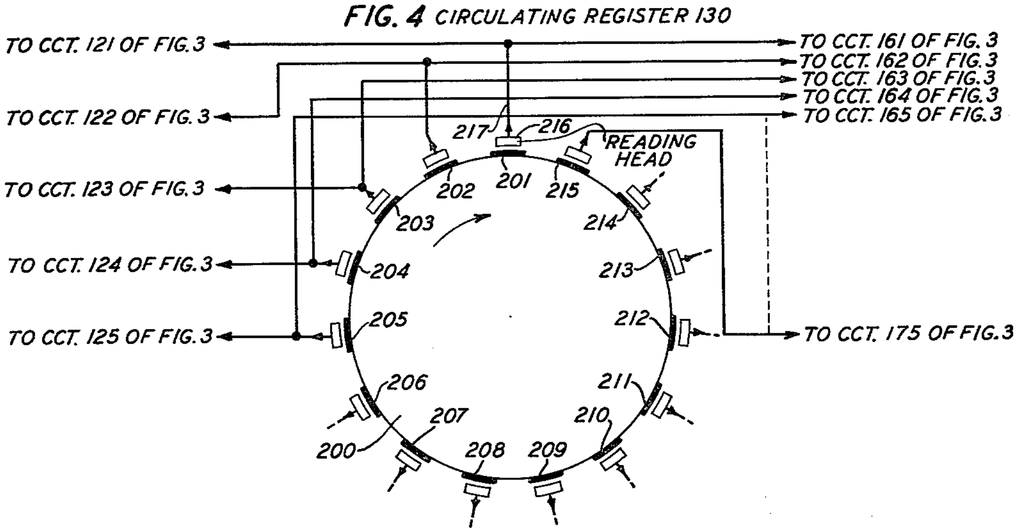
FIG. 8
0, 1, 2, 3-OUT-OF-15 GATE 316
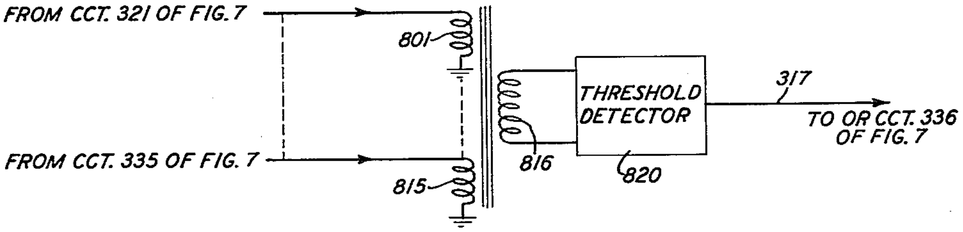
FIG. 9
12, 13, 14, 15-OUT-OF-15 GATE 318
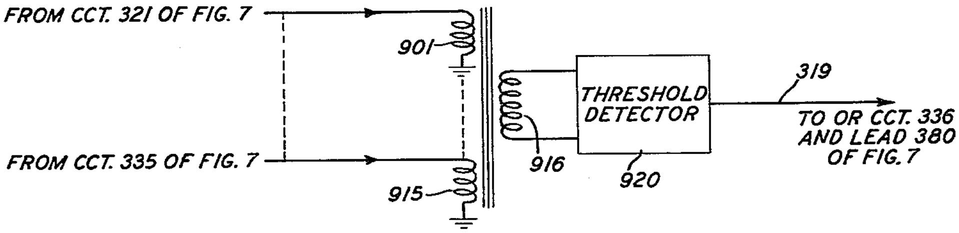
INVENTOR
P. G. NEUMANN
BY Lucian C. Canepa
ATTORNEY 3,051,784
Patented Aug. 28, 1962

3,051,784

ERROR-CORRECTING SYSTEM

Peter G. Neumann, Murray Hill, N.J., assignor to Bell Telephone Laboratories, Incorporated, New York, N.Y., a corporation of New York Filed May 12, 1961, Ser. No. 109,738
21 Claims. (Cl. 178—23)

This invention relates to digital information transmission systems, and more particularly to the automatic correction of errors in such systems.

The problem of correctly transmitting binary signals over a noisy channel is a significant one whose solution has been actively sought. Some illustrative situations in which this problem arises are: when telephone lines subject to error impulses are being used to transmit data in binary form; when an imperfect medium such as magnetic tape or a photographic emulsion is used to store binary data; or when operations on binary signals are being carried out by means of circuits constructed of devices such as relays, diodes, or transistors, which have a probability of error.

By the use of redundancy it is possible to encode a message for transmission in such a way that a decoder is able to extract the original information content from the redundant message despite the fact that the message may have been mutilated during transmission.

An object of the present invention is the improvement of digital information transmission systems.

More specifically, an object of this invention is a redundant digital information transmission system whose error-correcting capabilities extend to multiple errors.

Another object of the present invention is a self-correcting redundant transmission system whose overall organization is characterized by extreme simplicity of design.

These and other objects of the present invention are realized in an illustrative system embodiment thereof which comprises a source that supplies information words to an encoder, the encoder converting the information words into modified words containing sufficient redundancy to permit the words to be slightly mutilated by a noisy channel and still be correctly interpreted by a decoder. The modified words are sent via the noisy channel to the decoder, which reconstructs the original information words if the mutilation has not been excessive.

In the illustrative system the redundant binary code words to be transmitted from the encoder to the decoder comprise the code words and the complements thereof of a cyclic permutation set. For the specific example of a code set including N $n$-digit words, it is observed that each word of the set includes a unique $y$-digit subset identifier. These N subsets are the information words to be encoded and decoded. The minimum number of digit positions in which words of the set differ is $d$. In other words, the minimum distance between code words is $d$.

In the illustrative encoder a $y$-digit information word is successively compared with the subsets of one-half of the $n$-digit words of the code set, these words of the code set being sequentially generated by a suitable circulating storage device having stored therein only one of the words of the code set. When the information word is detected to be identical to the subset of one of the generated code words, a first signal is provided to gate the one code word to a transmission channel which is subject to multiple error impulses. On the other hand, when the information word is detected to be exactly the inverse of the subset of one of the generated code words, a second signal is provided to gate the inverse or complement of the one code word to the channel.

The illustrative decoder receives a redundant $n$-digit word from the channel and is capable of abstracting therefrom the original information word even if the redundant word was mutilated during transmission in $m-1$ adjacent or nonadjacent digit positions.

In the decoder the received redundant word is successively compared with one-half of the $n$-digit words of the code set, these words of the code set being sequentially generated by another circulating storage device having stored therein only one of the words of the code set. The results of the comparison operation are coupled to two circuits, one of which provides an output signal only if differences are detected in $\leqq m-1$ corresponding digits of the received and generated words, and the other of which provides an output signal only if differences are detected in $\geqq n-(m-1)$ corresponding digits of the received and generated words.

Assume that an unmutilated word is received by the decoder. Comparison of the unmutilated word with $$\frac{N}{2}-1$$

of the $N/2$ words generated by the circulating storage device triggers neither one of the above-mentioned circuits. However, comparison of the unmutilated word with the $N/2^{\text{th}}$ generated word necessarily triggers one or the other of the two circuits, depending respectively upon whether the received word is identical to or the exact inverse of the generated word. In turn, this triggering action causes either the information subset of the identical generated word or the inverse of the information subset of the generated word to be gated out of the decoder.

Similarly, if the $n$-digit redundant word becomes mutilated during transmission in $\leqq m-1$ digit positions, only the comparison between the mutilated word and one of the generated words will, because of the distance properties of the code set, trigger one or the other of the noted circuits to provide a gating signal. In the case of a mutilated redundant word, the correct information word is recognized by the decoder without consideration of exactly which digits of the received word were in error.

It is a feature of the present invention that a self-correcting digital information transmission system include an encoder which comprises a first circuit for generating a plurality of information words, a second circuit for sequentially generating one-half of the words of a code set, each word of the set including $n$ digits and being uniquely characterized by a subset that is identical to one of the plurality of information words, a third circuit responsive to the output words of the first and second circuits for successively comparing an information word with the subsets of the generated words and for providing a first gating signal if the information word is identical to one of the subsets and a second gating signal if the information word is the exact inverse of one of the subsets, and a fourth circuit responsive to the first gating signal for gating the generated code word to a channel and responsive to the second gating signal for gating the inverse of the generated code word to the channel.

It is another feature of this invention that a self-correcting digital information transmission system include a decoder connected to the noisy channel for receiving therefrom a code word which may have been mutilated, the decoder including a first circuit for sequentially generating one-half of the words of the code set to which the received code word belongs, a second circuit responsive to a received code word and to the output code word of the first circuit for successively comparing the received code word with the output code words and for providing a first gating signal if the received code word and one of the output code words differ in $\leqq m-1$ digit places and for providing a second gating signal if the received code word and one of the output code words differ in $\geqq n-(m-1)$ digit places, and a third circuit responsive to the first gating signal for gating out of the decoder the unique subset of the output code word whose comparison resulted in the difference in $\leqq m-1$ digit places and responsive to the second gating signal for gating out of the decoder the inverse of the unique subset of the output code word whose comparison resulted in the difference in $\geqq n-(m-1)$ digit places.

A complete understanding of the present invention and of the above and other objects, features and advantages thereof may be gained from a consideration of the following detailed description of a specific illustrative embodiment thereof presented hereinbelow in connection with the accompanying drawing, in which:

FIG. 1 is a tabular listing of the code words and subset members of a particular cyclic permutation code;

FIG. 2 is a tabular listing of the characteristics of various cyclic permutation codes;

Figure 3:
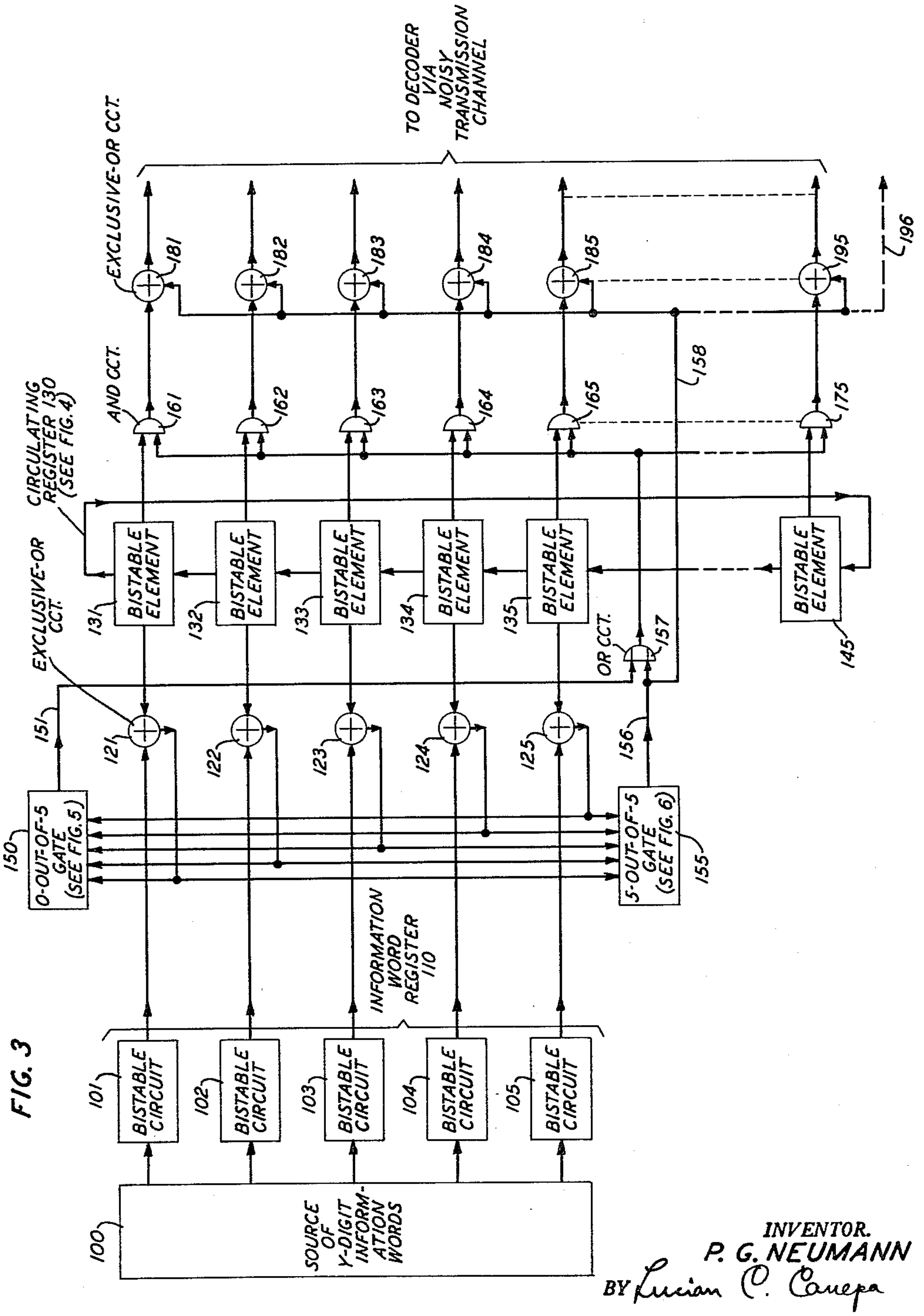
FIG. 3 depicts a specific illustrative encoder made in accordance with the principles of the present invention.
Figure 7:
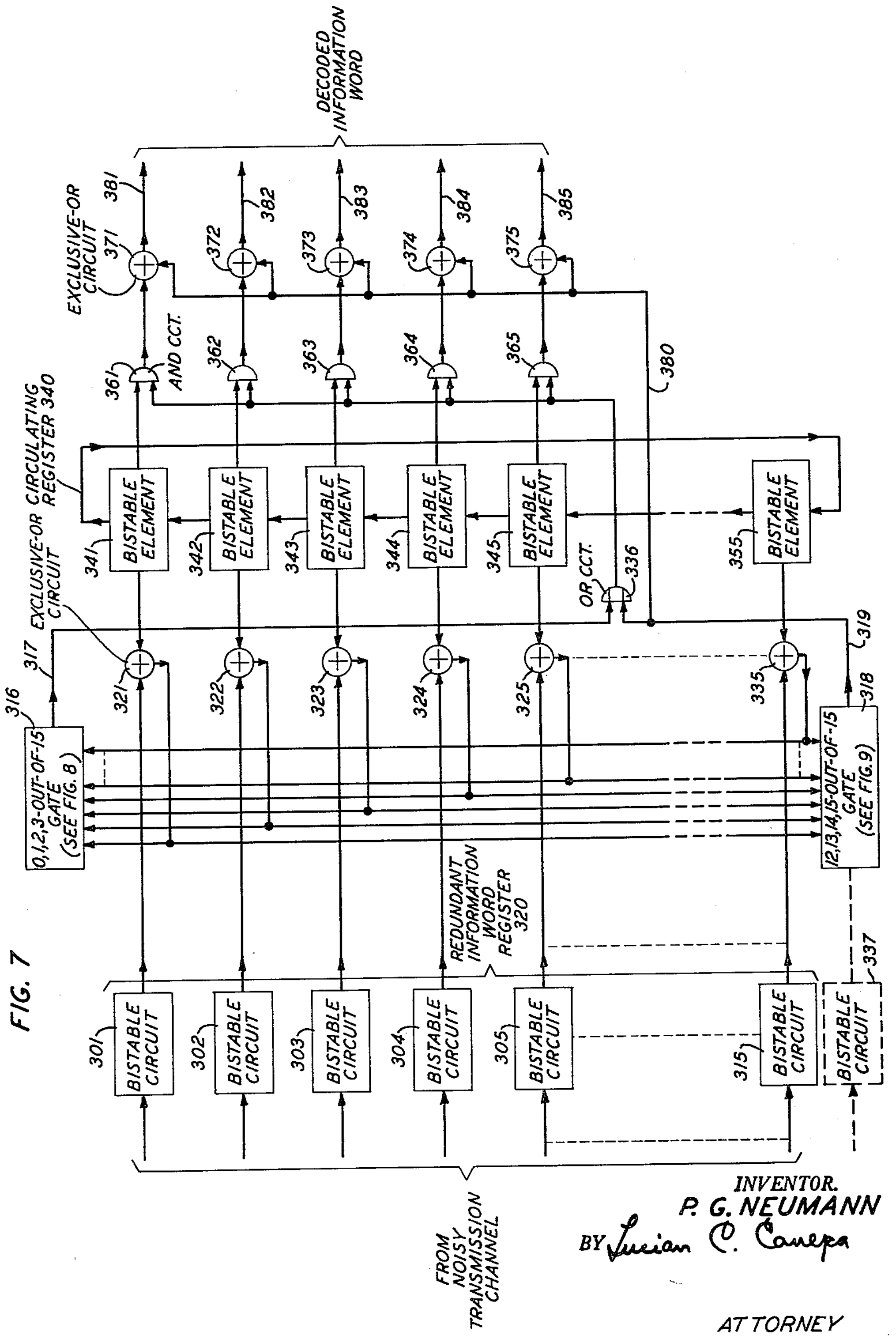

FIGS. 4, 5, and 6 show the details of three of the components included in the FIG. 3 encoder;

FIG. 7 depicts a specific illustrative decoder made in accordance with the principles of the present invention; and FIGS. 8 and 9 show the details of two of the components included in the FIG. 7 decoder.

An understanding of what is meant by the term "cyclic permutation code" is essential to a clear and complete comprehension of the details of the present invention. Accordingly, before proceeding to a description of a specific illustrative system made in accordance with the principles of the present invention, there are presented hereinbelow a general discussion of cyclic permutation codes and several specific examples thereof.

A cyclic permutation code is generated by a binary sequence $a_0$ which contains $4m-1$ digits. An example of such a generating sequence for the specific case in which $m$ equals 4 is the 15-digit word 111101011001000, whose digit positions, reading from left to right, will be respectively identified by the numerals 0 through 14. By removing the left-hand one of the digits of the sequence $a_0$ and suffixing it to the right-hand side of the remaining digits, the next sequence $a_1$ of a permutation set of binary sequences or code words is obtained. Similarly, by cycling or shifting the sequence $a_1$ one digit position to the left, while inserting the digit formerly in position No. 0 into position No. 14, the next code word $a_2$ of the permutation set is formed.

The permutation set of code words which can be derived from the generating sequence $a_0$ by repeatedly cycling the sequence in the manner specified above is listed in tabular form in the upper portion of FIG. 1, the sequences $a_0$ through $a_{14}$ comprising the words of a cyclic permutation code set. Also listed in FIG. 1, specifically in the lower portion thereof, are the respective complements $\bar{a}_0$ through $\bar{a}_{14}$ of the sequences $a_0$ through $a_{14}$. Thus, the main code set listed in FIG. 1 includes a total of thirty 15-digit words. Additionally, FIG. 1 lists the all-zero 15-digit sequence $A_0$ and the all-one 15-digit sequence $A_1$. Hence, the complete code set listed in FIG. 1 includes $8m$ (or thirty-two) 15-digit words.

Each of the 32 words listed in FIG. 1 includes a unique 5-digit subset identifier word whose respective digits appear in positions 0, 1, 2, 3, and 4 of each 15-digit word. Thus, for example, the subset 11110 is uniquely characteristic of the sequence $a_0$; the subset 11101 is uniquely characteristic of the sequence $a_1$, and so forth. The thirty-two subsets which respectively correspond to the thirty-two 15-digit words are listed in FIG. 1.

As will be clear from the detailed description contained hereinbelow, an illustrative self-correcting system made in accordance with the principles of the present invention may be implemented to transmit any 15-digit word of either the 30-word main code set or the 32-word complete code set listed in FIG. 1. Briefly, some of the characteristics of such an illustrative system are as follows: The maximum error-correcting capabilities of the system extend to $m-1$ (or 3) adjacent or nonadjacent digit errors per transmitted word. Each original information word in such a specific system includes $y$ (or 5) digits and corresponds, for example, exactly to one of the subsets represented in FIG. 1. The encoder of the system converts each 5-digit original word into an $n$-digit redundant information word, where $n=4m-1$ (or 15), the redundant encoded information word being the particular code word of which the information word is uniquely characteristic. The minimum number of digit positions in which two redundant information words of the illustrative system differ is expressed by $d=2m-1$ (or 7). The decoder of such a specific system receives from the encoder a redundant 15-digit word which may have been mutilated and extracts therefrom the original 5-digit information word.

Various classes of cyclic permutation codes are known. These classes include (1) quadratic residue codes, (2) recursive codes, and (3) twin-prime codes.

A quadratic residue cyclic permutation code exists for $n=4m-1$ whenever $4m-1$ is a prime number. Such a code is generated by the sequence $$a_0=a_0^0a_0^1a_0^2 \ldots a_0^{4m-2}$$

wherein $a_0^1$ equals "1" if $i$ is a quadratic residue of $4m-1$ and wherein $a_0^1$ equals "0" if $i$ is a quadratic nonresidue of $4m-1$. The quadratic residues of the prime number $4m-1$ are the integers defined by $i=j^2$ (modulo $4m-1$), for $j=0, 1, 2 \ldots 2m-1$. For example, the quadratic residues of $4m-1$ for $m$ equals 2 are 0, $1^2$, $2^2$, $3^2$ (modulo 7), or 0, 1, 4, and 2, the resulting sequence $a_0=1110100$ being the generating sequence of the code. Similarly, it can be shown that the generating sequences for $n=3$, 11, 19, 23, and 31 are respectively 110, 11011100010, 1100111101010000110,
11111010110011001010000, and
1110110111110001010111000010010 0.

It is noted that a Lincoln Laboratories Report (M.I.T., Lexington, Mass.), R. M. Lerner and A. M. Sherman Astia number AD–241, 464), contains a tabulation of quadratic residues of prime numbers up to 1021. Additionally, "Binary Codes With Specified Minimum Distance," M. Plotkin, I.R.E. Transactions on Information Theory, September 1960, pages 445–450, contains more detailed information on quadratc residue codes.

The second class of cyclic permutation code is derived from modulo 2 polynomials. Such polynomials are, for example, described in "Linear Recurring Sequences," N. Zierler, Journal of the Society of Industrial and Applied Mathematics, March 1959, pages 31–48. Given any maximal irreducible polynomial of degree $k$, its corresponding maximal sequence, of length $n=2^k-1=4m-1$, generates a permutation code set which includes $4m-1$ words characterized by a distance of $2m-1$. This type of code is designated herein as being "recursive" and is described in "An Error-Correcting Encoder and Decoder," J. H. Green, Jr. and R. L. San Soucie, Proceedings of the I.R.E., October 1958, pages 1741–1744, in which a parity check type of decoder is discussed.

Finally, A. Brauer, in "On a New Class of Hadamard Matrices," Math. Zeitschrift, volume 58, 1953, pages 219–225, discloses that if the numbers $p$ and $q$, where $q=p+2$, are twin-primes, then there exists an orthogonal matrix of order $pq+p^2$. Hence, a so-called "twin-prime" cyclic permutation code exists for $n=pq$. Such a code may be constructed from the quadratic residues of the twine-primes. The first few such codes have $n=1\times3=3$, $n=3\times5=15$, and $n=5\times7=35$.

Referring now to FIG. 2, there are shown in tabular form the characteristics of various cyclic permutation codes of the type described above. In FIG. 2 the letters Q, R, and T respectively denote quadratic residue, recursive, and twin-prime codes. The letters S and U indicate the existence of other cyclic permutation codes. The letters are included in FIG. 2 to indicate which codes are available to satisfy the characteristics of a particular row, while an equals sign therein indicates that two code types are equivalent. Thus, for example, if it is desired to encode information words for reliable transmission over a channel which subjects each encoded word to $<3$ digit errors, it is seen from the fourth row of FIG. 2 (for which row $m-1$ equals 3) that a cyclic permutation code of either the recursive or twin-prime type would be suitable for embodiment in the encoder and that in this case the two codes are equivalent.

The principles of the present invention are described hereinbelow as being illustratively applied to a specific transmission system having an error-correcting capability of 3 adjacent or nonadjacent digits per word. A recursive code, and specifically the recursive code described above and represented in FIG. 1, is embodied in the specific system to be described.

FIG. 3 illustrates the encoder of such a specific triple-error-correcting system. A 5-digit information word which is to be encoded for transmission to a decoder via a noisy transmission channel is supplied by a source 100 to the bistable circuits 101 through 105 of an information word register 110. To begin with, it is assumed that the source 100 may supply to the register 110 any one of the thirty 5-digit subsets corresponding to the thirty code words of the main code set represented in FIG. 1. Later, it will be shown that the principles of the invention also extend to the case in which the source 100 supplies to the register 110 any one of the thirty-two 5-digit subsets of the thirty-two code words of the complete code set depicted in FIG. 1.

Output binary signals representative of the states of the bistable circuits 101 through 105 of FIG. 3, and therefore also representative of the 5 digits of an information word, are respectively coupled to EXCLUSIVE-OR circuits or modulo 2 adders 121 through 125. Additionally, the circuits 121 through 125 successively receive as inputs thereto from a circulating register 130 the first 5 digits (i.e., the subset or information word) of one-half of the thirty 15-digit code words, specifically the code words $a_0$ through $a_{14}$, of the main code set represented in FIG. 1.

The circulating register 130 is schematically depicted in FIG. 4. The register 130 comprises 15 bistable elements 131 through 145, only the first 5 of which are respectively connected to the EXCLUSIVE-OR circuits 121 through 125. The register 130 need have actually stored therein only one of the code words included in the main code set shown in FIG. 1. Then, as that single code word is circulated through the register 130, there are successively generated thereby one-half of the code words of the main set. To see this more clearly, assume that initially the digits in positions 0 through 14 of the code word or generating sequence $a_0$ are respectively stored in the bistable elements 131 through 145 of the register 130. In this initial case, the 5 signals coupled to the EXCLUSIVE-OR circuits 121 through 125 from the bistable elements 131 through 135 would be respectively representative of the 5 digits of the subset which is uniquely characteristic of the code word $a_0$. Then, as the information stored in the register 130 is circulated one digit position in a clockwise direction, the digits in positions 0 through 14 of the next code word $a_1$ of the cyclic permutation set represented in FIG. 1 are respectively stored in the bistable elements 131 through 145 of the register 130, and the 5 signals coupled to the circuits 121 through 125 from the elements 131 through 135 are respectively representative of the 5 digits of the subset which is uniquely characteristic of the code word $a_1$.

As the above-described circulating action continues, the subsets respectively associated with the code words $a_0$ through $a_{14}$ of FIG. 1 are successively applied as inputs to the EXCLUSIVE-OR circuits or modulo 2 adders 121 through 125. These unique subsets are identical to one-half of the information words which the source 100 is capable of supplying to the circuits 101 through 105 and are the respective inverses of the other one-half of the output words of the source 100. Consequently, the modulo 2 adders 121 through 125 provide five "0" output signals only if the digits of a subset generated by the circulating register 130 are respectively identical to the digits of an information word supplied by the source 100. On the other hand, the modulo 2 adders 121 through 125 provide five "1" output signals only if the digits of a subset generated by the register 130 are the respective inverses of the digits of an information word from the source 100.

Output signals from the circuits 121 through 125 shown in FIG. 3 are coupled to a 0-out-of-5 gate 150 and also to a 5-out-of-5 gate 155. The gate 150 provides a "1" signal on output lead 151 thereof only if a "0" signal is applied to every one of its input leads, while the gate 155 provides a "1" signal on output lead 156 thereof only if a "1" signal is applied to every one of its input leads. In other words, the output of gate 150 is a "1" signal whenever the 5 digits stored in the bistable elements 131 through 135 of the circulating register 130 are respectively identical to the digits of the information word stored in the bistable circuits 101 through 105, while the output of the gate 150 is a "1" signal whenever the 5 digits stored in the bistable elements 131 through 135 of the register 130 are the respective inverses of the digits of the information word stored in the bistable circuits 101 through 105.

Assume that a "1" signal appears on the output lead 151 of the 0-out-of-5 gate 150 and that a "0" signal appears on the output lead 156 of the 5-out-of-5 gate 155, thereby indicating that the 15-digit word stored at that time in the register 130 is the code word of which the information word supplied by the source 100 is the unique subset. The "1" signal passes through an OR circuit 157 and is applied to each of AND circuits 161 through 175 to gate therethrough from the register 130 the digits of the particular 15-digit code word whose subset is identical to the 5-digit output word of the source 100. Additionally, since one input terminal of each of EXCLUSIVE-OR circuits or modulo 2 adders 181 through 195 has applied thereto via leads 156 and 158 a "0" signal, the output signals from the AND circuits 161 through 175 are passed without any change in their respective binary values through the circuits 181 through 195 to appear on the output leads thereof as a 15-digit redundant information word to be transmitted to the decoder.

On the other hand, assume that a "1" signal appears on the output lead 156 of the 5-out-of-5 gate 155 and that a "0" signal appears on the output lead 151 of the 0-out-of-5 gate 150, thereby indicating that the 15-digit word stored at that time in the register 130 is the exact inverse of the redundant version of the information word supplied by the source 100. The "1" signal passes through the OR circuit 157 and is applied to each of the AND circuits 161 through 175 to gate therethrough the digits of the particular 15-digit code word whose subset is the exact inverse of the 5-digit output word of the source 100. This "1" signal is also applied to each of the modulo 2 adders 181 through 195, thereby causing the output signals from the AND circuits 161 through 175 to be inverted (or complemented) before being passed to the channel for transmission to the decoder.

The circulating register 130 may take any one of several forms. One illustrative arrangement therefor is depicted in cross section in FIG. 4 which shows a rotatable magnetic drum assembly comprising a cylindrical drum 200 which is rotated in a clockwise direction by a driving mechanism (not shown). Disposed on the surface of the drum 200 are 15 magnetizable bistable regions 201 through 215 with each of which is associated a conventional reading head. Each reading head senses whether the bistable region therebelow is magnetized to represent a "0" or a "1" value and couples a signal representative thereof to the output lead of the head, which lead, in turn, extends to selected points of the encoding circuitry shown in FIG. 3. Thus, for example, the region 201 of FIG. 4 has associated with it the reading head 216 whose output lead 217 is connected to one input terminal of the EXCLUSIVE-OR circuit 121 and to one input terminal of the AND circuit 161.

The operation of the illustrative circulating register 130 depicted in FIG. 4 can easily be demonstrated by assuming that the digits in positions 0 through 14 of the code word $a_0$ listed in FIG. 1 are initially stored in the magnetizable regions 201 through 215, respectively, of the drum 200. In that case, and for the drum position depicted in FIG. 4, the first 5 digits of $a_0$ are respectively coupled to the EXCLUSIVE-OR circuits 121 through 125 of FIG. 3, and all 15 digits of the word $a_0$ are respectively coupled to the AND circuits 161 through 175 of FIG. 3. Assume that the drum 200 is then rotated clockwise so that the bistable region 202 is brought directly under the reading head 216. The 5-digit word which is then applied to the circuits 121 through 125 is the unique subset of $a_1$, and the 15 digits of the word $a_1$ are applied to the circuits 161 through 175. Then, continued rotation of the drum 200 sequentially and repeatedly generates the code words $a_0$ through $a_{114}$ and their respective subsets.

The 0-out-of-5 gate 150 that is included in the FIG. 3 encoder may, for example, be of the form shown in detail in FIG. 5. The gate 150 of FIG. 5 includes an AND circuit 500 and 5 inverters 501 through 505. Clearly, a "1" signal appears on the output lead 151 of the AND circuit 500 only in response to the application of a "0" signal to every one of the inverters 501 through 505.

Additionally, the 5-out-of-5 gate 155 of the FIG. 3 encoder may, illustratively, simply be a 5-input AND circuit 600 (FIG. 6).

The other component circuits out of which the specific encoder shown in FIG. 3 is formed are known and completely conventional, and are, accordingly, not shown in detail in the drawing.

Turning now to FIG. 7, there is shown a specific illustrative decoder made in accordance with the principles of the present invention. The decoder receives from the transmission channel a 15-digit redundant word, possibly mutilated in a maximum of 3 digit positions, and extracts therefrom the original 5-digit information word.

The 15 digits of the received redundant word are applied from the transmission channel to bistable circuits 301 through 315 of a register 320 included in the decoder shown in FIG. 7. In turn, signals representative of the states of the circuits 301 through 315 are respectively coupled to EXCLUSIVE-OR or modulo 2 adder circuits 321 through 335. Also, coupled to the modulo 2 circuits 321 through 335 are signals representative of the code word stored in the bistable elements 341 through 355 of a circulating register 340 which sequentially generates the code words $a_0$ through $a_{14}$ of the main code set shown in FIG. 1.

Assume, to begin with, that the redundant word received by the decoder was not mutilated during transmission. As a result, successive comparisons between the received word and the code words $a_0$ through $a_{14}$ generated by the register 340 provide at the outputs of the circuits 321 through 335 (1) fifteen "0" signals if the two compared words are identical, or (2) fifteen "1" signals if the two compared words are exactly complementary, or (3) seven or eight "1" signals otherwise. Item No. 3 stems from the fact that any two code words of the main set represented in FIG. 1 differ in at least seven and at most eight digit positions.

Assume next that the received redundant word was mutilated during transmission in one digit position. Then, successive comparisons yield at the outputs of the circuits 321 through 335 (1) fourteen "0" signals and one "1" signal if the two compared words are identical except in the one mutilated digit position, or (2) fourteen "1" signals and one "0" signal if the two compared words are exactly complementary except in the one mutilated digit position, or (3) six, seven, eight, or nine "1" signals otherwise.

Furthermore, if the received redundant word was multilated during transmission in two digit positions, successive comparisons of the signals from the circuits 301 through 315 with those from the elements 341 through 355 provide at the outputs of the circuits 321 through 335 (1) thirteen "0" signals and two "1" signals if the two compared words are identical except in the two mutilated digit positions, or (2) thirteen "1" and two "0" signals if the two compared words are exactly complementary except in the two mutilated digit positions, or (3) five, six, nine, or ten "1" signals otherwise.

Finally, if the redundant word received by the decoder from the channel was mutilated during transmission in three digit positions, successive comparisons between the mutilated word and the words $a_0$ through $a_{14}$ provide at the outputs of the circuits 321 through 335 (1) twelve "0" signals and three "1" signals if the two compared words are identical except in the three mutilated digit positions, or (2) twelve "1" signals and three "0" signals if the two compared words are exactly complementary except in the three mutilated digit positions, or (3) four, five, ten, or eleven "1" signals otherwise.

Clearly, then, if two discriminating circuits capable of respectively responding only to the application thereto of 0, 1, 2 or 3-out-of-15 "1" signals, or 12, 13, 14 or 15-out-of-15 "1" signals are connected to the outputs of the circuits 321 through 335 of the decoder shown in FIG. 7, one discriminating circuit would provide a "1" signal output only in response to the receipt by the decoder of a mutilated or unmutilated counterpart of one of the words $a_0$ through $a_{14}$, and the other discriminating circuit would provide a "1" signal output only in response to the receipt of the decoder of a mutilated or unmutilated counterpart of the exact complement of one of the words $a_0$ through $a_{14}$.

The two circuits of FIG. 7 which perform the above-described discrimination functions are a 0, 1, 2, 3-out-of-15 gate 316 and a 12, 13, 14, 15-out-of-15 gate 318. Each of the gates 316 and 318 has applied thereto as inputs the 15 output signals from the modulo 2 adder circuits 321 through 335. The gate 316 provides a "1" signal on output lead 317 only if 0, 1, 2 or 3-out-of-15 "1" signals are applied as inputs thereto, while the gate 318 provides a "1" signal on output lead 319 only if 12, 13, 14 or 15-out-of-15 "1" signals are applied as inputs thereto.

The "1" signal output of the gate 316 is passed through OR circuit 336 to gate through AND circuits 361 through 365 the digits appearing in positions 0 through 4 of the output code word stored at that time in the circulating register 340. It is noted that the output of the gate 318 during this time is "0." This "0" signal is passed via leads 319 and 380 to an input terminal of each of EXCLUSIVE-OR circuits 371 through 375. Consequently, the circuits 371 through 375 directly pass the signals appearing at the outputs of AND circuits 361 through 365 to information output leads 381 through 385.

Similarly, the "1" signal output of the gate 318, which signal, it is recalled, results from the receipt by the decoder of a mutilated or unmutilated counterpart of the exact complement of one of the words $a_0$ through $a_{14}$, is passed through the OR circuit 336 to gate through the AND circuits 361 through 365 the digits appearing in positions 0 through 4 of the output code word stored at that time in the circulating register 340. This "1" signal is also applied as an input signal to each of the EXCLUSIVE-OR circuits 371 through 375, thereby causing the signals which appear on the information output leads 381 through 385 to be the respective complements of the outputs of the AND circuits 361 through 365.

Thus, whether the redundant information word received by the decoder was unmutilated or whether the word contained as many as 3 digit errors, the correct subset thereof is gated out of the register 340. It is significant to note that this is acomplished without the decoder actually specifically recognizing which, if any, of the received digits were in error.

The circulating register 340 may take any one of several forms. Illustratively, it may be of the general form of the register described above and shown in FIG. 4. However, it is to be understood that any suitable circulating storage arrangement, whether it include a punched paper tape, a photographic emulsion, a perforated disc, a magnetic tape, et cetera, may be employed as the register 340 (or the register 130).

The 0, 1, 2, 3-out-of-15 gate 316 that is included in the FIG. 7 decoder may, for example, be of the form shown in detail in FIG. 8. The gate 316 of FIG. 8 includes a transformer assembly comprising 15 input windings 801 through 815 and an output winding 816. Connected to the output winding 816 of the transformer assembly is a threshold detector 820, illustratively, a diode or a transistor, which is adjusted to provide a "1" signal on the output lead 317 thereof only if driving "1" signals are applied to 0, 1, 2 or 3 of the input windings of the assembly.

Additionally, a specific illustrative embodiment of the 12, 13, 14, 15-out-of-15 gate 318 of the FIG. 7 decoder is shown in FIG. 9. The gate 318 of FIG. 9 includes a transformer assembly comprising 15 input windings 901 through 915 and an output winding 916. Connected to the output winding 916 is a threshold detector 920 which is adjusted to provide a "1" signal on the output lead 319 thereof only if driving "1" signals are applied to 12, 13, 14 or 15 of the input windings of the assembly.

The other component circuits out of which the specific decoder shown in FIG. 7 is formed are known and completely conventional, and are, accordingly, not shown in detail in the drawing.

Both the encoding and decoding operations described above may be carried out on either a synchronous or an asynchronous basis. For example, if redundant words which are received from the channel by the decoder are equally spaced in time, it is necessary that the time interval required for (1) a word to be read into the decoding circuitry, (2) cycling of the register 340 through the 15 words $a_0$ through $a_{14}$, and (3) a word to be read out of the decoding circuitry and applied to the information output leads 381 through 385, be less than the time interval between arrivals of redundant words at the decoder.

On the other hand, if the arrivals of redundant information words at the decoder are suitably buffered, for example, received on a storage tape (not shown) and then delivered to the register 320 upon request, the time required for the decoding operation may in effect be cut in half. Specifically, this may be accomplished by applying the "1" signal output of the gates 316 and 318 to the buffer storage tape to control the transfer of a word from the tape to the register 320. In this case, the cycling action of the register 340 can go on without interruption from whatever point it left off during the decoding of the previous redundant information word. Assuming that redundant information words are applied to the decoder in a random fashion, only 7½ code words, rather than 15, would on the average have to be generated by the circulating register 340 in order to decode a received information word.

As indicated above, the encoder may also be operated on an asynchronous basis, in which case the "1" signal output of the gates 150 and 155 is used to trigger the source 100 to cause read-in of an original information word to the register 110. In this mode of operation the average number of words required to be generated by the register 130 during the encoding of an information word would be only 7½ words.

The error correction system described herein may be modified to permit encoding of the information words 00000 and 11111, thereby to provide their respective code words $A_0$ and $A_1$ (FIG. 1) for transmission to the decoder. This may be accomplished, for example, by modifying the circulating register 130 so that during some portion of its cycle of operation it provides an all-zero output word. In that case the detection by the 0-out-of-5 circuit 150 of the information word 00000 causes the code word $A_0$ to be gated out of the register 130, while the detection by the 5-out-of-5 circuit 155 of the information word 11111 causes the code word $A_1$ to be gated out of the register 130. Alternatively, the register 130 need not be modified and detection circuits which are uniquely responsive to the information words 00000 and 11111 may be provided to supply control signals to inhibit the output of the register 130 or to cause the register 130 to emit an all-one sequence.

Similarly, the decoder, and specifically the circulating register 340 thereof, may be modified to provide for the decoding of the redundant information words $A_0$ and $A_1$. If there are 0, 1, 2 or 3 "1's" in the received redundant word, then the all-zero code word $A_0$ was transmitted; while if there are 12, 13, 14 or 15 "1's" in the received word, then the all-one code word $A_1$ was transmitted. Therefore, if the register 340 is modified so that during some portion of its cycle of operation it provides an all-zero output word, or if read-out from the register 340 is blocked for a portion of its cycle of operation, the gates 316 and 318 of the decoder shown in FIG. 7 may be used directly to provide the necessary gating and complementation signals. Alternatively, the register 340 need not be modified and detection circuits which are uniquely responsive to the presence of the code words $A_0$ and $A_1$ may be provided.

The principles of the present invention extend to the case in which a parity check digit is added to each of the code words represented in FIG. 1 to make the number of "1's" in each code word even (or odd). The resulting system embodiment of such a code is then capable not only of correcting $m-1$ adjacent or nonadjacent digit errors in each redundant information word but also of detecting an arbitrary $m$-digit error therein.

To modify the encoder shown in FIG. 3 for the case in which each redundant information word is to include an even parity check digit, it is only necessary to add to the encoder another lead 196 which directly connects the output of the 5-out-of-5 gate 155 to the transmission channel. This is so because each of the code words $a_0$ through $a_{14}$ already contains an even number of "1's," whereas each of the code words $\bar{a}_0$ through $\bar{a}_{14}$ contains an odd number of "1's" and would, therefore, require the suffixing of another "1" digit thereto. Note that the additional lead 196 is shown in FIG. 3 in dotted lines.

To modify the decoder shown in FIG. 7 so that it can receive a 16-digit redundant information word which includes an even parity check digit, it is necessary to add an additional bistable circuit 337 to the register 320 to receive the 16th digit from the transmission channel, as indicated by dotted lines in FIG. 7. Furthermore, the gates 316 and 318 of the FIG. 7 decoder must in this case be respectively changed to 0, 1, 2, 3-out-of-16 and 13, 14, 15, 16-out-of-16 gates.

The addition of a 4, 12-out-of-16 gate to the decoding circuitry of a system of the type in which each redundant information word also includes a parity check digit gives the system the ability to detect $m$ or quadruple errors. Illustratively, the output of this additional gate may be used to request retransmission of the mutilated information word. In fact, in order to increase the probability that a correctable triple error is not actually a quintuple error, it might be desirable to request retransmission of the redundant information word whenever a triple error has apparently occurred.

Finally, it is to be understood that the above-described arrangements are only illustrative of the application of the principles of the present invention. Numerous other arrangements may be devised by those skilled in the art without departing from the spirit and scope of the invention. For example, although emphasis herein has been directed to applying the principles of this invention to the correction of errors which occur on a transmission channel that interconnects spaced encoding and decoding units, it is to be understood that these principles are equally applicable to the correction of errors in information processing equipment which is positioned at a single location. Specifically, the principles of the present invention are to be understood to apply to the correction of arbitrary errors which somehow occur in the equipment.

What is claimed is:

1. In combination in a self-correcting system for transmitting a digital information word over a noisy channel which introduces $\leqq m-1$ digit errors in the transmitted word, where $m$ is any positive integer greater than one, an encoder comprising first means for generating and storing any one of a plurality of information words, second means for sequentially generating one-half of the words of a code set, each word of the set being $n$ digits in length, where $n \geqq 4m-1$, and being uniquely characterized by a subset which is identical to one of said plurality of information words, means responsive to the output words of said first and second means for successively comparing an information word with the subsets of the generated words and for providing a first gating signal if said information word is identical to one of said subsets and a second gating signal if said information word is the exact inverse of one of said subsets, and means responsive to said first gating signal for gating to said noisy channel the generated code word which includes said identical subset and responsive to said second gating signal for gating to said noisy channel the inverse of the generated code word which includes said inverse subset; and a decoder connected to said noisy channel for receiving therefrom a code word which may be mutilated, said decoder including third means for sequentially generating one-half of the words of said code set, means responsive to a received code word and to the output code words of said third means for successively comparing a received code word with said output code words and for providing a third gating signal if said received code word and one of said output code words differ in $\leqq m-1$ digit places and for providing a fourth gating signal if said received code word and one of said output code words differ in $\geqq n-(m-1)$ digit places, and means responsive to said third gating signal for gating out of said decoder the unique subset of the output code word whose comparison resulted in said difference in $\leqq m-1$ digit places and responsive to said fourth gating signal for gating out of said decoder the inverse of the unique subset of the output code word whose comparison resulted in said difference in $\geqq n-(m-1)$ digit places.

2. A combination as in claim 1 wherein said first means includes a source of $y$-digit information words, where $y \geqq \log_2 8m$, and a $y$-stage information word register responsive to the output of said source.

3. A combination as in claim 2 wherein said second means includes a first circulating register comprising $n$ bistable elements.

4. A combination as in claim 3 wherein said means responsive to the output words of said first and second means includes a first group of $y$ modulo 2 adder circuits respectively responsive to the states of the $y$ stages of said information word register and to the states of $y$ of the $n$ bistable elements of said first circulating register.

5. A combination as in claim 4 wherein said means responsive to the output words of said first and second means further includes a 0-out-of-$y$ gate responsive to the outputs of said first group of $y$ modulo 2 adder circuits for providing said first gating signal, and a $y$-out-of-$y$ gate responsive to the outputs of said first group of $y$ modulo 2 adder circuits for providing said second gating signal.

6. A combination as in claim 5 wherein said means responsive to said first and second gating signals includes $n$ AND circuits respectively responsive to the states of the $n$ bistable elements of said first circulating register, and a first group of $n$ modulo 2 adder circuits respectively responsive to the output signals of said $n$ AND circuits, each of said first group of $n$ modulo 2 adder circuits being also responsive to said first and second gating signals.

7. A combination as in claim 6 wherein said third means includes a second circulating register comprising $n$ bistable elements.

8. A combination as in claim 7 wherein said means responsive to a received code word and to the output code words of said third means includes a second group of $n$ modulo 2 adder circuits respectively responsive to the binary values of the $n$ digits of a received code word and to the states of the $n$ bistable elements of said second circulating register.

9. A combination as in claim 8 wherein said means responsive to a received code word and to the output code words of said third means further includes a $(0, 1, 2 \ldots m-1)$-out-of-$n$ gate responsive to the outputs of said second group of $n$ modulo 2 adder circuits for providing said third gating signal, and an $[n-(m-1), n-(m-2) \ldots n]$-out-of-$n$ gate responsive to the outputs of said second group of $n$ modulo 2 adder circuits for providing said fourth gating signal.

10. A combination as in claim 9 wherein said means responsive to said third and fourth gating signals includes $y$ AND circuits respectively responsive to the states of $y$ of the $n$ bistable elements of said second circulating register, and a second group of $y$ modulo 2 adder circuits respectively responsive to the output signals of said $y$ AND circuits, each of said second group of $y$ modulo 2 adder circuits being also responsive to said third and fourth gating signals.

11. In combination in a self-correcting system for transmitting a digital information word over a noisy channel which introduces $\leqq m-1$ digit errors in the transmitted word, where $m$ is any positive integer greater than one, an encoder comprising first means for generating and storing any one of a plurality of information words, second means for sequentially generating one-half of the words of a code set, each word of the set being $n$ digits in length, where $n \geqq 4m-1$, and being uniquely characterized by a subset which is identical to one of said plurality of information words, means responsive to the output words of said first and second means for successively comparing an information word with the subsets of the generated words and for providing a first gating signal if said information word is identical to one of said subsets and a second gating signal if said information word is the exact inverse of one of said subsets, and means responsive to said first gating signal for gating to said noisy channel the generated code word which includes said identical subset and responsive to said second gating signal for gating to said noisy channel the inverse of the generated code word which includes said inverse subset.

12. A combination as in claim 11 wherein said first means includes a source of $y$-digit information words, where $y \geq \log_2 8m$, and a $y$-stage information word register responsive to the output of said source.

13. A combination as in claim 12 wherein said second means includes a circulating register comprising $n$ bistable elements.

14. A combination as in claim 13 wherein said means responsive to the output words of said first and second means includes $y$ modulo 2 adder circuits respectively responsive to the states of the $y$ stages of said information word register and to the states of $y$ of the $n$ bistable elements of said circulating register.

15. A combination as in claim 14 wherein said means responsive to the output words of said first and second means further includes a 0-out-of-$y$ gate responsive to the outputs of said $y$ modulo 2 adder circuits for providing said first gating signal, and a $y$-out-of-$y$ gate responsive to the outputs of said $y$ modulo 2 adder circuits for providing said second gating signal.

16. A combination as in claim 15 wherein said means responsive to said first and second gating signals includes $n$ AND circuits respectively responsive to the states of the $n$ bistable elements of said circulating register, and $n$ modulo 2 adder circuits respectively responsive to the output signals of said $n$ AND circuits, each of said $n$ modulo 2 adder circuits being also responsive to said first and second gating signals.

17. In combination in a decoder that is connected to a noisy transmission channel for receiving therefrom an $n$-digit code word which may be mutilated in $\leq m-1$ digit positions, where $m$ is any positive integer greater than one, and $n \geq 4m-1$, means for sequentially generating one-half of the words of a code set of which said received word is a member, means responsive to a received word and to the output words of said generating means for successively comparing said received word with said output words and for providing a first gating signal if said received word and one of said output words differ in $\leq m-1$ digit positions and for providing a second gating signal if said received word and one of said output words differ in $\geq n-(m-1)$ digit positions, and means responsive to said first gating signal for gating out of said decoder the unique subset of the output word whose comparison resulted in said difference of $\leq m-1$ digits and responsive to said second gating signal for gating out of said decoder the inverse of the unique subset of the output word whose comparison resulted in said difference of $\geq n-(m-1)$ digits.

18. A combination as in claim 17 wherein said generating means includes a circulating register comprising $n$ bistable elements.

19. A combination as in claim 18 wherein said means responsive to a received word and to the output words of said generating means includes $n$ modulo 2 adder circuits respectively responsive to the binary values of the digits of a received word and to the states of the $n$ bistable elements of said circulating register.

20. A combination as in claim 19 wherein said means responsive to a received word and to the output words of said generating means further includes a $(0, 1, 2 \ldots m-1)$-out-of-$n$ gate responsive to the outputs of said $n$ modulo 2 adder circuits for providing said first gating signal and an $[n-(m-1), n-(m-2) \ldots n]$-out-of-$n$ gate responsive to the outputs of said $n$ modulo 2 adder circuits for providing said second gating signal.

21. A combination as in claim 20 wherein said means responsive to said first and second gating signals includes $y$ AND circuits respectively responsive to the states of $y$ of the $n$ bistable elements of said circulating register, where $y \geq \log_2 8m$, and $y$ modulo 2 adder circuits respectively responsive to the output signals of said $y$ AND circuits, each of said $y$ modulo 2 adder circuits being also responsive to said first and second gating signals.

No references cited.